United States Patent
Gibson et al.

(10) Patent No.: US 9,188,763 B2
(45) Date of Patent: Nov. 17, 2015

(54) SCOPE ZOOM LEVER

(71) Applicant: MGM Holdings, LLC, Cheyenne, WY (US)

(72) Inventors: Travis S. Gibson, Middleton, ID (US); James Mack, Kuna, ID (US)

(73) Assignee: MGM HOLDINGS, LLC, Cheyenne, WY (US)

( * ) Notice: Subject to any disclaimer, the term of this patent is extended or adjusted under 35 U.S.C. 154(b) by 123 days.

(21) Appl. No.: 14/160,397

(22) Filed: Jan. 21, 2014

(65) Prior Publication Data

US 2015/0205066 A1     Jul. 23, 2015

(51) Int. Cl.
    *G02B 15/14*      (2006.01)
    *G02B 7/04*      (2006.01)
    *G02B 23/00*      (2006.01)

(52) U.S. Cl.
    CPC . *G02B 7/04* (2013.01); *G02B 23/00* (2013.01)

(58) Field of Classification Search
    CPC .......... G02B 7/04; G02B 23/00; G02B 15/14; G02B 15/00
    See application file for complete search history.

(56) References Cited

U.S. PATENT DOCUMENTS 5,276,554 A *    1/1994    Nassivera ..................... 359/694

* cited by examiner

*Primary Examiner* — Joseph P Martinez
(74) *Attorney, Agent, or Firm* — Bennet K. Langlotz; Langlotz Patent & Trademark Works, Inc.

(57) ABSTRACT

A scope zoom lever has a lever having a first lever attachment facility and a second lever attachment facility, an elongated strap having a first end having a first strap attachment facility adapted to connect to the first lever attachment facility, and an opposed second end having a second attachment facility adapted to connect to the second lever attachment facility, the second attachment facility having a plurality of alternative attachment locations to accommodate a range of adjustment ring diameters, the first attachment facility having a tensioning feature operable to snug the strap after the second attachment facility is connected. The first attachment facility may include a threaded fastener. The threaded fastener may be connected to one of the lever and the strap, and wherein the other of the lever and the strap includes a bore adapted to receive the fastener.

16 Claims, 7 Drawing Sheets

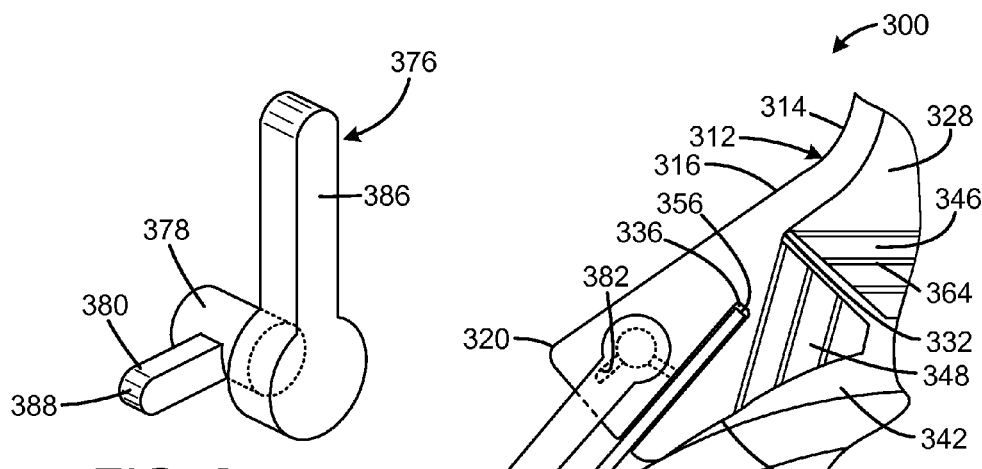
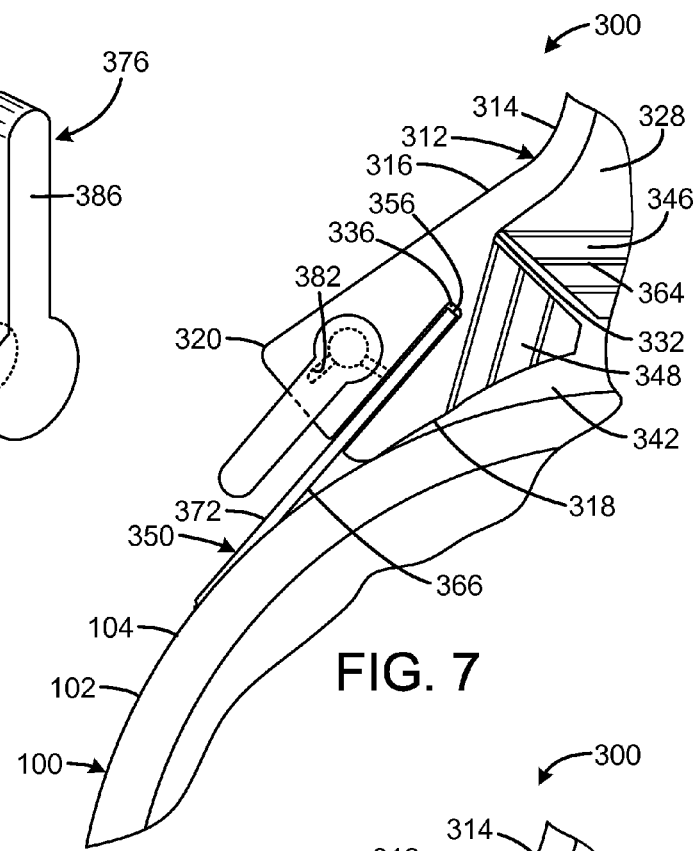
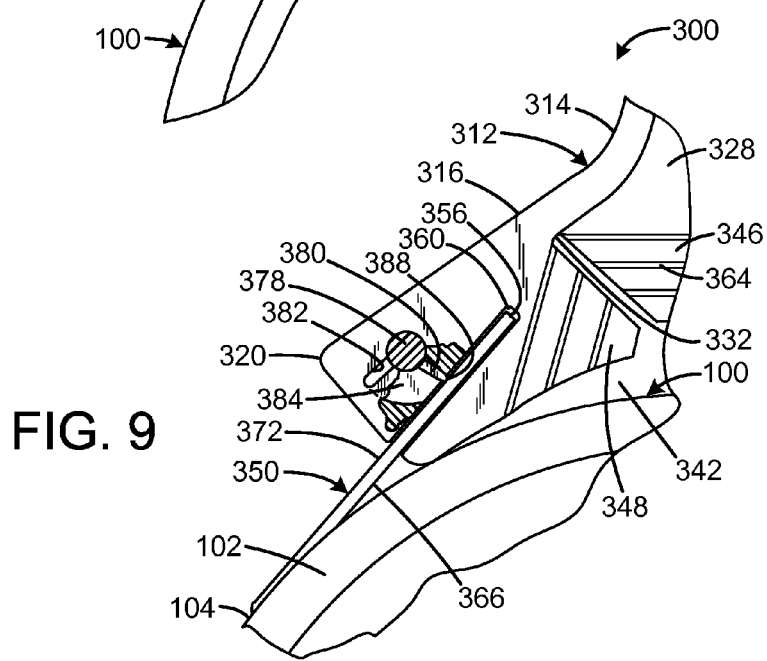

SCOPE ZOOM LEVER

FIELD OF THE INVENTION

The present invention relates to any optical equipment with adjustable magnification, and more particularly to a scope zoom lever that provides a handle for the power adjustment ring of any rifle or spotting scope.

BACKGROUND OF THE INVENTION

Scope zoom levers are handles that make it much easier for a shooter to change the level of magnification on a rifle or spotting scope. Scope zoom levers attach to the power adjustment ring of any rifle or spotting scope. Instead of having to pinch the power adjustment ring and turn it to adjust the level of magnification, a shooter can simply push on the lever with a finger. This enables the shooter to adjust the scope's power setting without leaving the shooting position (dismounting the rifle) or losing his or her sight picture. Furthermore, the power adjustment ring can be easily adjusted even while wearing gloves or in slippery or wet conditions. Additionally, in cold climates, the grease used by the scope manufacturer thickens, making the scope adjustment more difficult. The ability to quickly adjust the scope's power setting is particularly appealing to 3-gun competitors, military and law enforcement snipers, and hunters, who must rapidly switch from a low power with a wide field of view to a high power setting with a much narrower field of view.

A variety of prior art scope zoom levers have been created for several existing rifle scopes. However, most of these have the disadvantage of being highly customized to fit a specific rifle scope model's power adjustment ring. As a result, the manufacturer must make, and a retailer must stock, many different precisely machined scope zoom levers at considerable expense in order to comprehensively address the market. As a result, even scope zoom levers that are made of plastic rather than aluminum still cost a substantial percentage of the cost of a rifle scope.

Therefore, a need exists for a new and improved scope zoom lever that provides a handle for the power adjustment ring of any rifle scope. In this regard, the various embodiments of the present invention substantially fulfill at least some of these needs. In this respect, the scope zoom lever according to the present invention substantially departs from the conventional concepts and designs of the prior art, and in doing so provides an apparatus primarily developed for the purpose of providing a handle for the power adjustment ring of any optical equipment with an adjustable power setting.

SUMMARY OF THE INVENTION

The present invention provides an improved scope zoom lever, and overcomes the above-mentioned disadvantages and drawbacks of the prior art. As such, the general purpose of the present invention, which will be described subsequently in greater detail, is to provide an improved scope zoom lever that has all the advantages of the prior art mentioned above.

To attain this, the preferred embodiment of the present invention essentially comprises a lever having a first lever attachment facility and a second lever attachment facility, an elongated strap having a first end having a first strap attachment facility adapted to connect to the first lever attachment facility, and an opposed second end having a second strap attachment facility adapted to connect to the second lever attachment facility, the second attachment facility having a plurality of alternative attachment locations to accommodate a range of adjustment ring diameters, the first attachment facility having a tensioning feature operable to snug the strap after the second attachment facility is connected. The first attachment facility may include a threaded fastener. The threaded fastener may be connected to one of the lever and the strap, and wherein the other of the lever and the strap includes a bore adapted to receive the fastener. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

FIG. 7 is an enlarged fragmentary rear view of an alternative embodiment of the scope zoom lever constructed in accordance with the principles of the present invention installed on a rifle scope without an adjustment knob.

FIG. 8 is a top isometric view of the current embodiment of the outer locking lever removed from the scope zoom lever of FIG. 7.

FIG. 9 is an enlarged fragmentary sectional view of the scope zoom lever of FIG. 7.

The same reference numerals refer to the same parts throughout the various figures.

DESCRIPTION OF THE CURRENT EMBODIMENT

Figure 1:
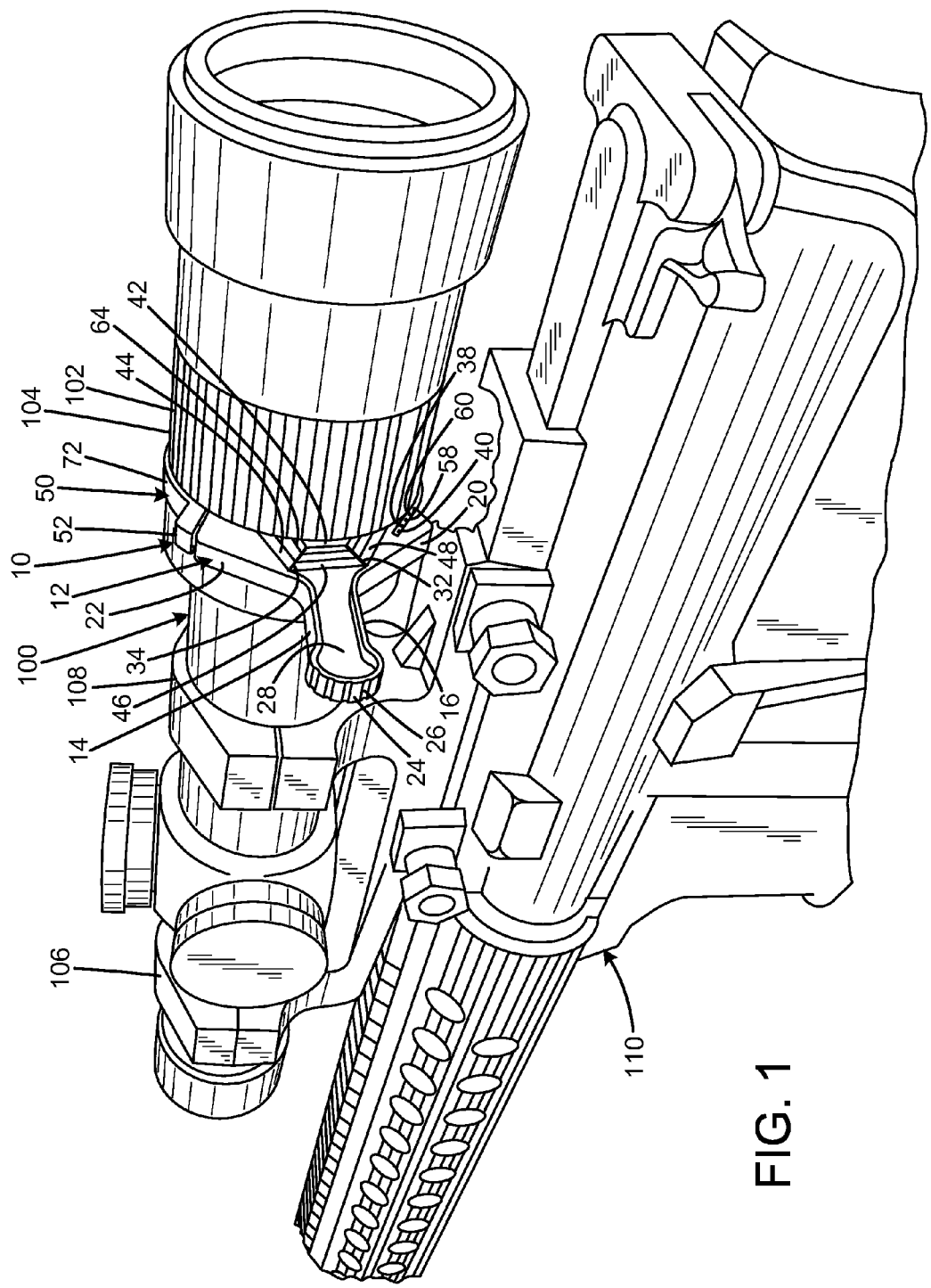
FIG. 1 is a rear perspective view of the current embodiment of the scope zoom lever constructed in accordance with the principles of the present invention installed on a rifle scope without an adjustment knob.
Figure 2:
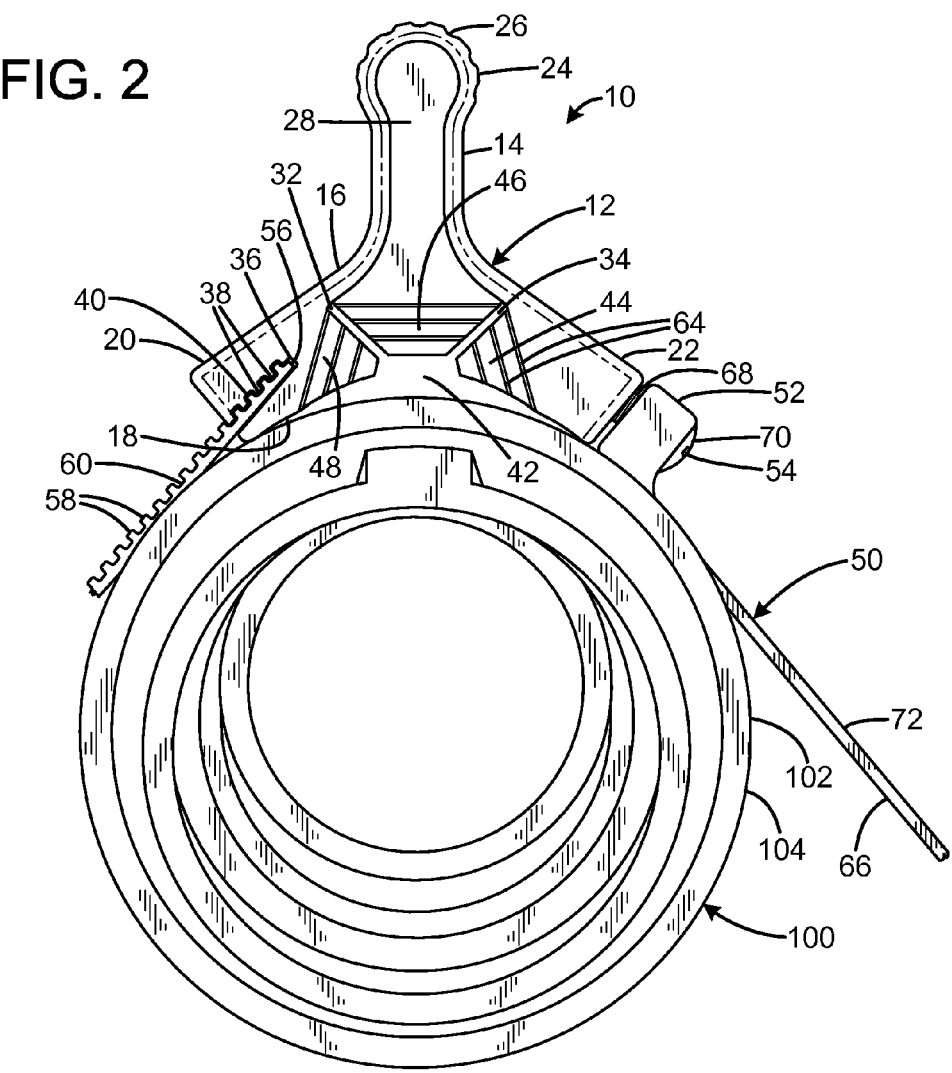
FIG. 2 is an enlarged rear view of the current embodiment of the scope zoom lever of FIG. 1 installed on a rifle scope without an adjustment knob.
Figure 3:
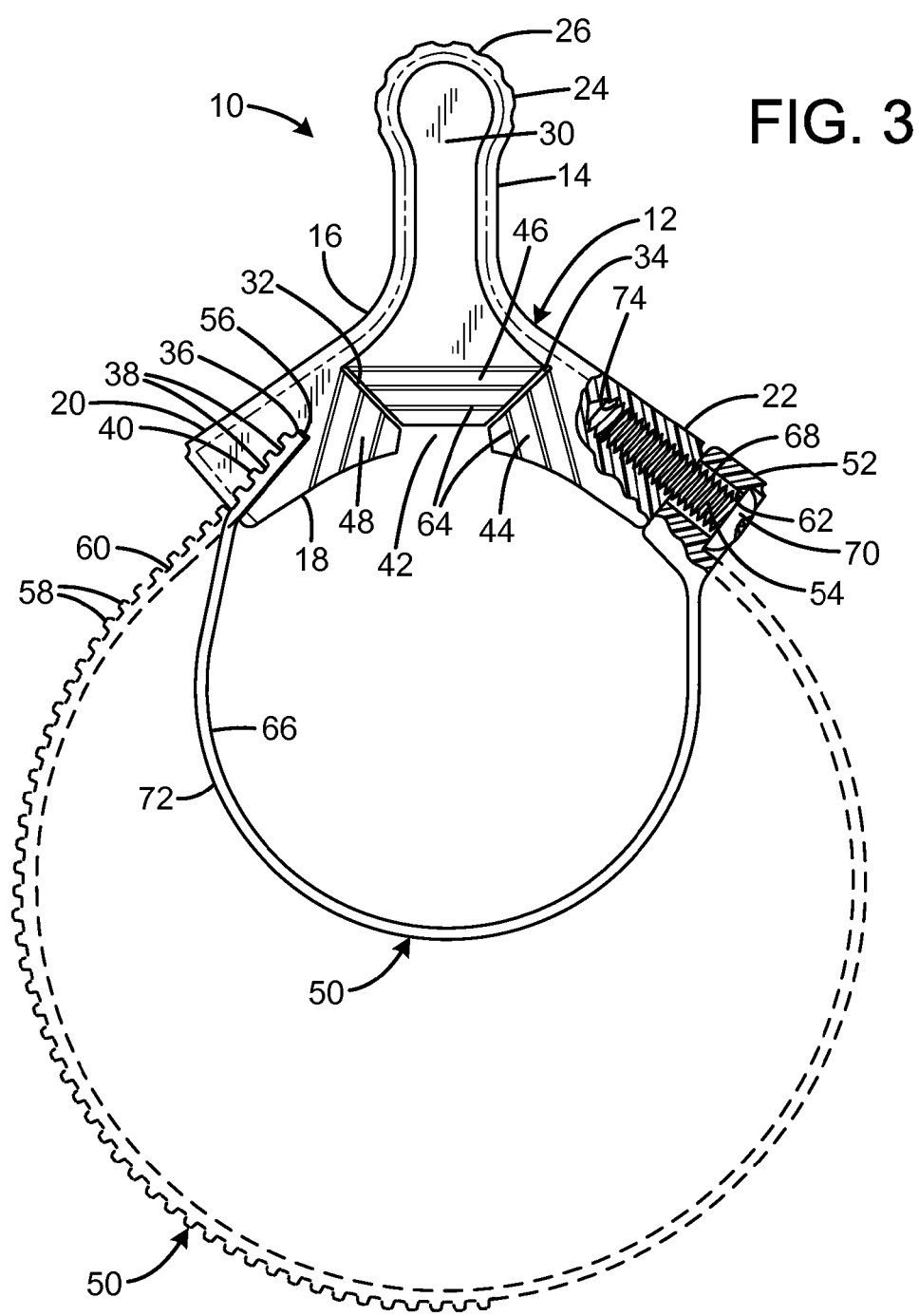
FIG. 3 is an enlarged rear view of the current embodiment of the scope zoom lever of FIG. 1 in the detached condition.
Figure 4:
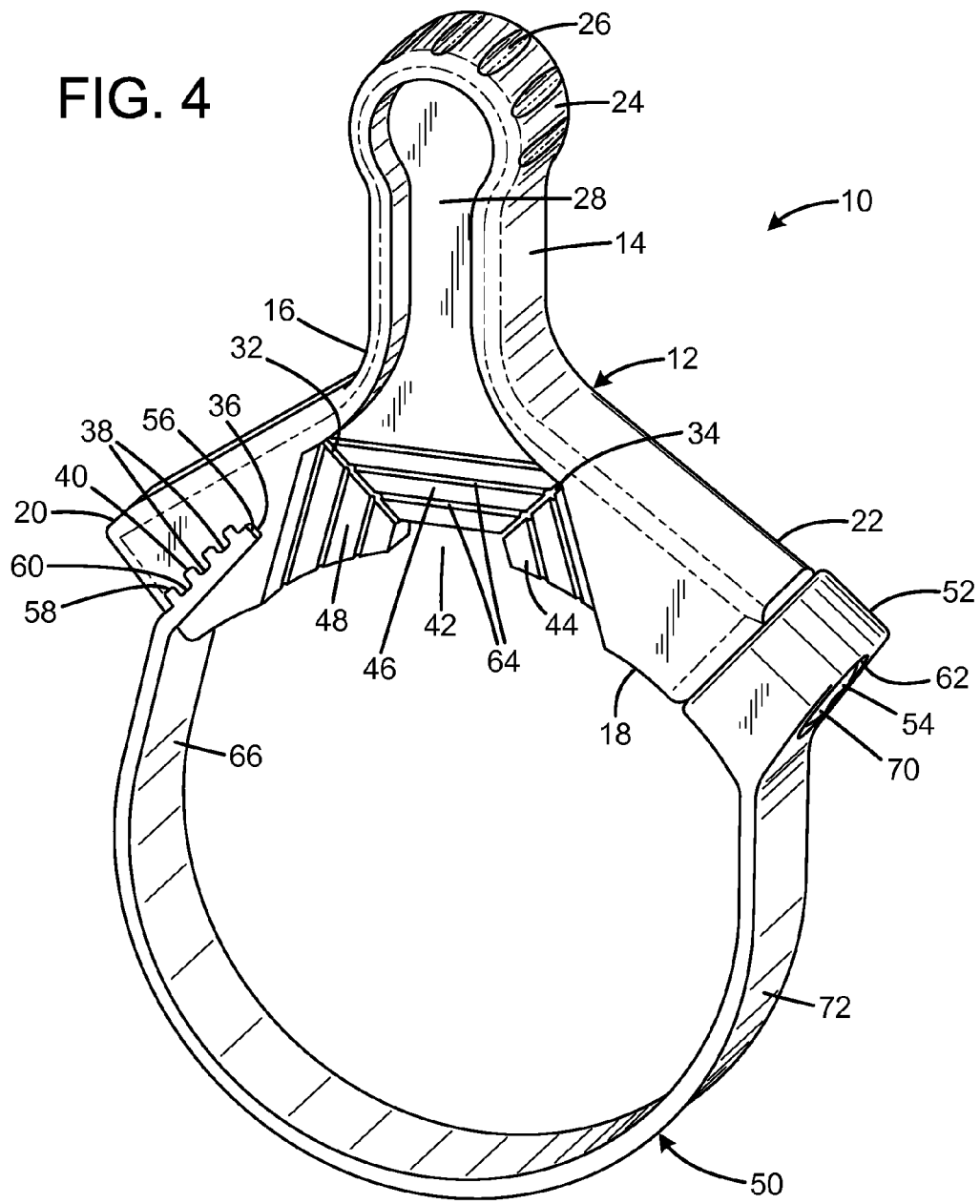
FIG. 4 is a right isometric view of the current embodiment of the scope zoom lever of FIG. 1 in the detached condition.
Figure 5:
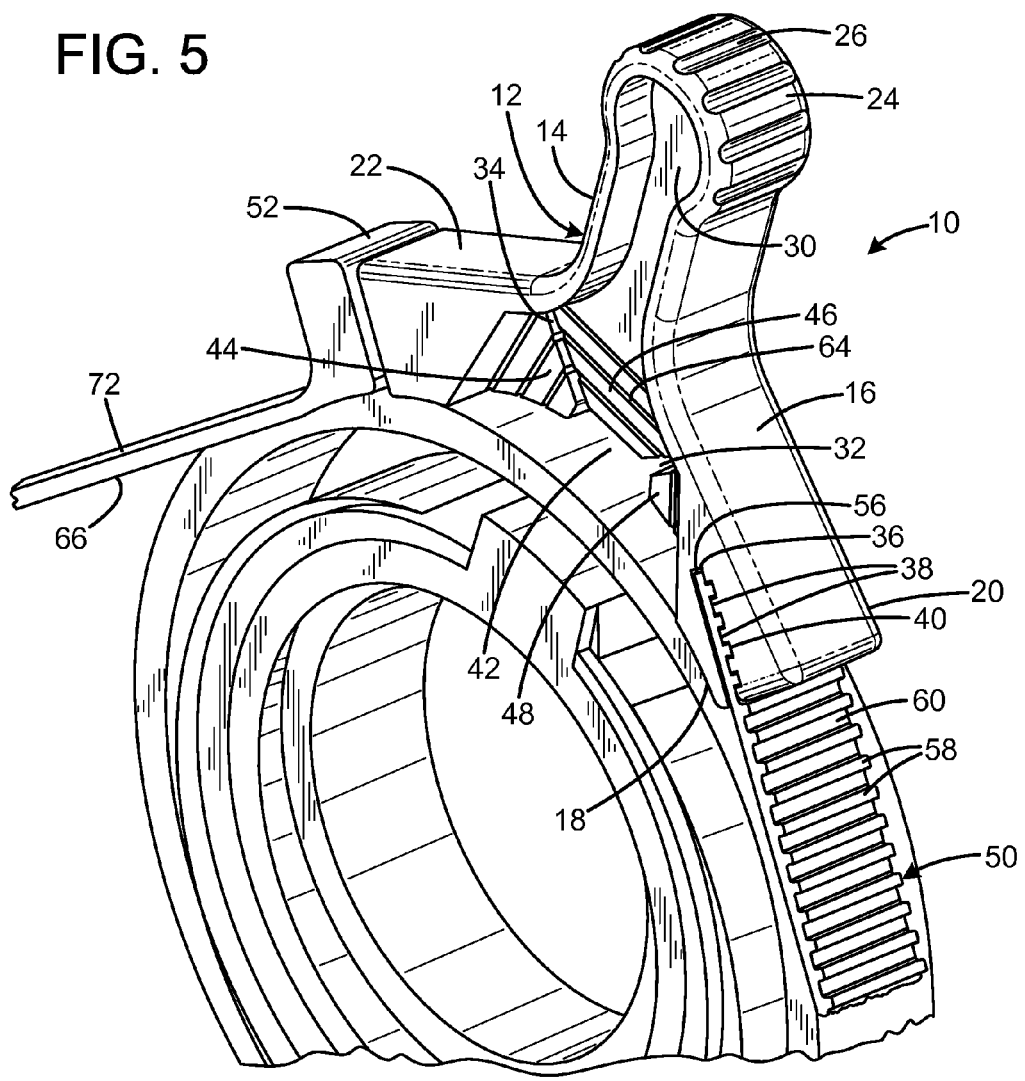
FIG. 5 is a left isometric view of the current embodiment of the scope zoom lever of FIG. 1 in the detached condition.

An embodiment of the scope zoom lever of the present invention is shown and generally designated by the reference numeral 10.

FIG. 1 illustrates the improved scope zoom lever 10 of the present invention. More particularly, the scope zoom lever is shown installed on the exterior 104 of the power adjustment ring 102 of a rifle scope 100. A front scope ring 106 and a rear scope ring 108 removably secure the rifle scope to a rifle 110. The power adjustment ring changes the rifle scope's level of magnification when the power adjustment ring is turned. In conventional operation, the shooter must pinch the power adjustment ring and then turn it in order to change the rifle scope's level of magnification. However, with the scope zoom lever installed, the shooter can turn the power adjustment ring simply by pushing laterally on the handle 14 portion of the body 12 of the scope zoom lever with one or more fingers. In the current embodiment, the scope zoom lever is made of plastic.

FIGS. 2-5 illustrate the improved scope zoom lever 10 of the present invention. More particularly, the scope zoom lever is shown installed on the exterior 104 of the power adjustment ring 102 of a rifle scope 100 with the rifle scope shown in cross-section in FIG. 2 and in a detached condition in FIGS. 3-5. The scope zoom lever has a body 12 that is attached to a selected rifle scope by an elongate strap 50. The rifle scope 100 does not have an enlarged adjustment knob on the exterior of the power adjustment ring.

The body 12 has a top 16, bottom 18, left side 20, right side 22, and front 30. The top of the body forms a centrally protruding handle 14. The top of the handle terminates in an enlarged, rounded knob 24 with detents 26 to facilitate the gripping thereof and to prevent the shooter's finger from inadvertently sliding off the handle during operation of the scope zoom lever. The bottom of the body defines an adjustment knob space 42. In the default condition, the adjustment knob space is defined by right cutaway panels 44, middle cutaway panels 46, and left cutaway panels 48 with scores 64. The left and right cutaway panels are separated from the middle cutaway panels by a left slot 32 and a right slot 34. A portion of the left and right sides of the bottom of the body contacts the exterior 104 of the power adjustment ring 102 of the rifle scope 100 in the installed condition. The left and right slots between the cutaway panels enable flexing of the body to increase the bottom contact area with the exterior of the power adjustment ring.

The left side 20 of the body 12 defines a slot 36. One or more teeth 38 protrude into the slot 36 from the body and define spaces 40 therebetween. The right side 22 of the body has a central bore 74, which may be smooth-bored or optionally threaded. The strap 50 is attached to the body via the slot 36 and bore 74. The strap 50 has a screw receiver 52 at one end and terminates in an opposing free end 56. The screw receiver extends upwards from the top 72 of the strap and has a central bore 62 that receives a screw 54. The bore 62 has an enlarged opening that receives the head 70 of the screw when the screw is fully tightened. The threaded portion 68 of the screw extends completely through the bore 62 and is threadedly received within the bore 74 of the right side 22 of the body 12 when the scope zoom lever 10 is installed. Alternatively, the bore 74 can be located on the strap, and the bore 62 that receives the head of the screw can be located on the body. The bottom 66 of the strap is smooth and closely fits the exterior 104 of the power adjustment ring 102 such that the bottom of the strap will not slide when the handle 14 is moved.

The free end 56 of the strap 50 has teeth 58 extending upwards from the top surface 72. The teeth 58 define spaces 60 between them. The teeth 58 and spaces 60 are sized to match the teeth 38 and spaces 40 within the slot 36 of the left side 20 of the body 12 such that the spaces 60 can closely receive the teeth 38 and the spaces 40 can closely receive the teeth 58.

Figure 6:
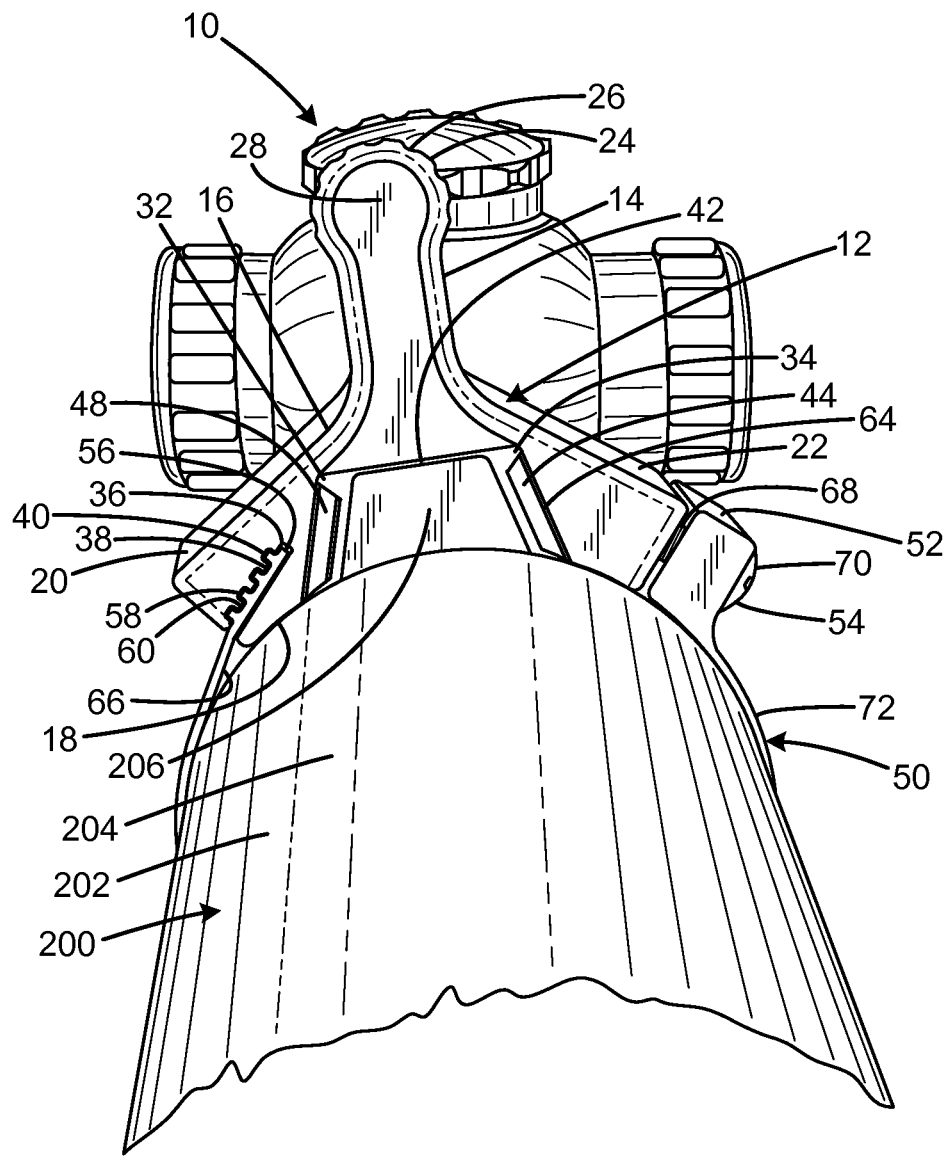
FIG. 6 is a rear perspective view of the scope zoom lever of FIG. 1 attached to a rifle scope with an adjustment knob.

FIG. 6 illustrates the improved scope zoom lever 10 of the present invention. More particularly, the scope zoom lever is shown installed on the exterior 204 of the power adjustment ring 202 of a rifle scope 200. The rifle scope 200 has an enlarged adjustment knob 206 on the exterior of the power adjustment ring. As a result, the scope zoom lever has been modified from its default condition to change the size of the adjustment knob space 42 in the bottom 18 of the body 12. Specifically, in order to accommodate the adjustment knob on the rifle scope 200, the right cutaway panels 44, middle cutaway panels 46, and left cutaway panels 48 are cutaway along scores 64 to enlarge the adjustment knob space sufficiently to receive the enlarged adjustment knob. The cutaway panels are scored in multiple locations so that the adjustment knob space can be enlarged by different selected amounts depending upon how much each of the cutaway panels is removed. In the current embodiment, each cutaway panel is scored three times to permit three increasingly larger amounts of adjustment to the width and depth of the adjustment knob space.

FIGS. 7-9 illustrate an alternative embodiment of the improved scope zoom lever 300 of the present invention. More particularly, the scope zoom lever is shown installed on the exterior 104 of the power adjustment ring 102 of a rifle scope 100 with the rifle scope shown in cross-section in FIGS. 7 and 9. The scope zoom lever has a body 312 that is attached to a selected rifle scope by an elongate strap 350. The rifle scope 100 does not have an enlarged adjustment knob on the exterior of the power adjustment ring. Except for the mechanism that retains the free end 356 of the strap 350 within the slot 336, the scope zoom lever 300 is identical to the scope zoom lever 10.

The body 312 has a top 316, bottom 318, left side 320, right side (not visible), and front (not visible). The top of the body forms a centrally protruding handle 314. The top of the handle terminates in an enlarged, rounded knob with detents (not visible) to facilitate the gripping thereof and to prevent the shooter's finger from inadvertently sliding off the handle during operation of the scope zoom lever. The bottom of the body defines an adjustment knob space 342. In the default condition, the adjustment knob space is defined by right cutaway panels (not visible), middle cutaway panels 346, and left cutaway panels 348 with scores 364. The left and right cutaway panels are separated from the middle cutaway panels by a left slot 332 and a right slot (not visible). A portion of the left and right sides of the bottom of the body contacts the exterior 104 of the power adjustment ring 102 of the rifle scope 100 in the installed condition. The left and right slots between the cutaway panels enable flexing of the body to increase the bottom contact area with the exterior of the power adjustment ring.

The left side 320 of the body 312 defines a slot 336. An internal cavity 384 communicates with the slot 336. A key slot 382 defined by the rear 328 of the left side of the body communicates with the internal cavity. An outer locking lever 376 is rotatably received within the internal cavity. The outer locking lever has a handle 386 that protrudes rearwardly from the internal cavity. A shaft 378 connects a locking cam 380 to the handle. The outer locking lever is mounted within the internal cavity by aligning the cam with the key slot 382 and then pushing the outer locking lever forward until the cam is received within the internal cavity. In that position, the cam is free to rotate between an unlocked position where the cam is aligned with the key slot and a locked position where the cam is rotated about 95° counterclockwise with respect to the key slot. In the locked position, the tip 388 of the cam protrudes into the slot 336.

The right side (not visible) of the body 312 has a central bore (not visible), which may be smooth-bored or optionally threaded. The strap 350 is attached to the body via the slot 336 and bore. The strap has a screw receiver (not visible) at one end and terminates in an opposing free end 356. The screw receiver extends upwards from the top 372 of the strap and has a central bore (not visible) that receives a screw (not visible). The bore (not visible) has an enlarged opening that receives the head (not visible) of the screw when the screw is fully tightened. The threaded portion (not visible) of the screw extends completely through the bore and is threadedly received within the bore of the right side (not visible) of the body 312 when the scope zoom lever 300 is installed. Alternatively, the bore can be located on the strap, and the bore that receives the head of the screw can be located on the body. The bottom 366 of the strap is smooth and closely fits the exterior 104 of the power adjustment ring 102 such that the bottom of the strap will not slide when the handle 314 is moved. The free end 356 of the strap 350 has a knurled top surface 372.

To install the scopes zoom lever 10 of the present invention, the user first selects a specific rifle scope. If the rifle scope has an adjustment knob that is larger than the default adjustment knob space in the body, the user cuts along the appropriate scores to remove a sufficient amount of the cutaway panels to accommodate the adjustment knob. The user then cuts the strap to the correct length based on the diameter of the adjustment knob. The user subsequently inserts the free end of the strap into the slot in the left side of the body from the front or rear and centers the free end of the strap within the slot. The user then inserts the screw into the screw receiver on the opposing end of the strap and screws the threaded portion of the screw into the bore in the right side of the body. Once the screw is fully tightened to tension the strap, the user checks for any slack in the strap. If the strap is too loose, the user trims the free end to shorten the strap, re-inserts the free end into the slot in the left side of the body, and re-tightens the screw. This process is repeated until the user achieves a tight fit of the strap around the exterior of the power adjustment ring. With a sufficiently tight fit, the bottom side of the strap frictionally engages the exterior of the power adjustment ring and turns the power adjustment ring when the handle is pushed laterally. The teeth on the free end of the strap are also secured in engagement with the teeth in the slot in the left side of the body by the strap tension.

To install the scope zoom lever 300 of the present invention, the user first selects a specific rifle scope. If the rifle scope has an adjustment knob that is larger than the default adjustment knob space in the body, the user cuts along the appropriate scores to remove a sufficient amount of the cutaway panels to accommodate the adjustment knob. The user then cuts the strap to the correct length based on the diameter of the adjustment knob. The user subsequently inserts the free end of the selected strap into the slot in the left side of the body from the front, rear, or left side and centers the free end of the strap within the slot. The user then secures the free end of the strap within the slot by mounting the outer locking lever within the internal cavity and rotating the handle counterclockwise about 95° until the tip of the locking cam engages with the knurled top surface of the free end of the strap. The user then inserts the screw into the screw receiver on the opposing end of the strap and screws the threaded portion of the screw into the bore in the right side of the body. Once the screw is fully tightened to tension the strap, the user checks for any slack in the strap. If the strap is too loose, the user trims the free end to shorten the strap, re-inserts the free end into the slot in the left side of the body, and re-tightens the screw. This process is repeated until the user achieves a tight fit of the strap around the exterior of the power adjustment ring. For fine adjustments, the user can adjust the amount of the free end of the strap that is received within the slot in the left side of the body and alter the location where the tip of the locking cam engages the free end of the strap. The outer locking lever enables an infinite range of adjustment compared to the finite range of adjustment defined by the teeth of the scope zoom lever 100. With a sufficiently tight fit, the bottom side of the strap frictionally engages the exterior of the power adjustment ring and turns the power adjustment ring when the handle is pushed laterally.

The tip of the locking cam goes past the 90° point by about 5° to provide a locking tendency. Since the tip goes past perpendicular to the strap contact point, it locks while also compressing the strap, which is elastomeric in the current embodiment. The locking lever can work as a quick release feature to avoid having to screw the other end together to tension the strap. Since the locking cam pulls the strap as the tip bites into the strap to tension the strap, the opposed end of the strap can be secured in advance by the screw or could be an integral part of the right side of the body.

While current embodiments of a scope zoom lever has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. For example, any suitable sturdy material such as a plastic strap with metal teeth (commercially available from elecDirect.com of Sanborn, N.Y.) may be used instead of the all-plastic strap described. Also, the plastic strap with teeth may also be strap webbing (commercially available from Best Buy Button & Buckle of Pasadena, Calif.) combined with a tri-glide fastener or a side release buckle fastener (both commercially available from Best Buy Button & Buckle of Pasadena, Calif.), or a metal buckle used to attach nylon strapping together (commercially available from Northern Tool+ Equipment of Burnsville, Minn.). Furthermore, a ratcheting tie down (commercially available from Harbor Freight Tools of Calabasas, Calif.) or a cam strap with S-hook (commercially available from US Cargo Control of Urbana, Iowa) may be used instead of the plastic strap with teeth described.

We claim:

1. A lever and attachment facility for attachment to a magnified optical equipment adjustment ring having a selected diameter, the facility comprising:
   a lever having a first lever attachment facility and a second lever attachment facility;
   an elongated strap having a first end having a first strap attachment facility adapted to connect to the first lever attachment facility, and an opposed second end having a second attachment facility adapted to connect to the second lever attachment facility;
   the second attachment facility having a plurality of alternative attachment locations to accommodate a range of adjustment ring diameters;
   the first attachment facility having a tensioning feature operable to snug the strap after the second attachment facility is connected.

2. The lever and attachment facility of claim 1 wherein the first attachment facility includes a threaded fastener.

3. The lever and attachment facility of claim 2 wherein the threaded fastener is connected to one of the lever and the strap, and wherein the other of the lever and the strap includes a bore adapted to receive the fastener.

4. The lever and attachment facility of claim 1 wherein the second attachment facility includes a plurality of discrete attachment points.

5. The lever and attachment facility of claim 4 wherein the second attachment facility includes a sacrificial end portion that is removable when the selected diameter is smaller than a selected threshold.

6. The lever and attachment facility of claim 1 wherein the second attachment facility includes an infinite range of alternative attachment locations.

7. The lever and attachment facility of claim 1 wherein the second lever attachment facility includes a recess.

8. The lever and attachment facility of claim 1 further comprising a plurality of second attachment facilities, each adapted to connect to the second lever attachment facility;
based on the selected diameter, cutting off a selected end portion of the strap at the second end to remove at least one of the second strap attachment facilities and to provide a remaining endmost second attachment facility;
connecting the remaining endmost second attachment facility to the second lever attachment facility; and
tightening the strap about the ring by way of adjusting a connection between the first strap attachment facility and the first lever attachment facility.

9. A method of attaching a lever to a magnified optical equipment adjustment ring having a selected diameter, the method comprising the steps:
providing a lever having a first lever attachment facility and a second lever attachment facility;
providing an elongated strap having a first end having a first strap attachment facility adapted to connect to the first lever attachment facility, and an opposed second end having a plurality of second attachment facilities, each adapted to connect to the second lever attachment facility;
based on the selected diameter, cutting off a selected end portion of the strap at the second end to remove at least one of the second strap attachment facilities and to provide a remaining endmost second attachment facility;
connecting the remaining endmost second attachment facility to the second lever attachment facility; and
tightening the strap about the ring by way of adjusting a connection between the first strap attachment facility and the first lever attachment facility.

10. The method of claim 9 wherein tightening the strap includes turning a screw connecting the strap to the lever.

11. The method of claim 9 including the step of positioning the lever to position an elongated handle portion of the lever radially away from the ring.

12. The method of claim 9 wherein connecting the remaining endmost second attachment facility to the second lever attachment facility includes inserting the remaining endmost second attachment facility into a recess defined by the second lever attachment facility.

13. A method of attaching a lever to a magnified optical equipment adjustment ring having a selected diameter, the method comprising the steps:
providing a lever having a first lever attachment facility and a second lever attachment facility;
providing an elongated strap having a first end having a first strap attachment facility adapted to connect to the first lever attachment facility, and an opposed second end adapted to connect to the second lever attachment facility;
based on the selected diameter, cutting off a selected end portion of the strap at the second end to provide a remaining second end;
connecting the remaining second end to the second lever attachment facility; and
tightening the strap about the ring by way of adjusting a connection between the first strap attachment facility and the first lever attachment facility.

14. The method of claim 13 wherein tightening the strap includes turning a screw connecting the strap to the lever.

15. The method of claim 13 including the step of positioning the lever to position an elongated handle portion of the lever radially away from the ring.

16. The method of claim 13 wherein connecting the remaining second end of the strap to the second lever attachment facility includes inserting the remaining second end into a recess defined by the second lever attachment facility and engaging a portion of the second lever attachment facility with the remaining second end to retain the remaining second end within the recess.

* * * * *